US008316349B2

(12) United States Patent
Morozov et al.

(10) Patent No.: US 8,316,349 B2
(45) Date of Patent: Nov. 20, 2012

(54) DEPLOYMENT SCRIPT GENERATION AND EXECUTION

(75) Inventors: Vladimir Yuryevich Morozov, Sammamish, WA (US); Stephen Matthew Schwink, Seattle, WA (US); Lily Ma, Bellevue, WA (US); Lubomir I. Birov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 12/788,317

(22) Filed: May 27, 2010

(65) Prior Publication Data
US 2011/0296377 A1   Dec. 1, 2011

(51) Int. Cl.
*G06F 9/44* (2006.01)
(52) U.S. Cl. .................................. 717/115; 717/113
(58) Field of Classification Search .............. 717/110, 717/111, 113, 115, 174
See application file for complete search history.

(56) References Cited

U.S. PATENT DOCUMENTS

| | | | | |
|---|---|---|---|---|
| 7,574,695 B2* | 8/2009 | Chander et al. | ............... | 717/126 |
| 7,716,470 B2* | 5/2010 | Stillerman et al. | ............ | 713/156 |
| 2004/0044739 A1* | 3/2004 | Ziegler | ........................... | 709/213 |
| 2007/0143339 A1 | 6/2007 | Springett | | |
| 2007/0250335 A1 | 10/2007 | Hodges et al. | | |
| 2007/0261018 A1 | 11/2007 | Sanghvi et al. | | |
| 2008/0109396 A1* | 5/2008 | Kacin | ............................. | 707/1 |
| 2008/0244564 A1* | 10/2008 | Sonkin et al. | ................. | 717/175 |
| 2009/0234804 A1 | 9/2009 | Whitechapel et al. | | |
| 2009/0254881 A1 | 10/2009 | Johnson et al. | | |
| 2010/0325624 A1* | 12/2010 | Bartolo et al. | ................. | 717/176 |
| 2011/0055807 A1* | 3/2011 | Mahajan et al. | .............. | 717/107 |
| 2011/0265081 A1* | 10/2011 | Lucovsky et al. | ............. | 717/177 |
| 2011/0289484 A1* | 11/2011 | Caine | ........................... | 717/127 |

OTHER PUBLICATIONS

Grehan, Oisin., "PowerShell SharePoint Provider", Retrieved at << http://www.codeplex.com/PSSharePoint >>, Retrieved Date: Feb. 3, 2010, pp. 2.
"PowerShell projects on CodePlex", Retrieved at << http://thepowershellguy.com/blogs/posh/archive/2007/01/13/powershell-projects-on-codeplex.aspx >>, Jan. 13, 2007, pp. 3.
"First look: Microsoft SharePoint 2010 Beta", Retrieved at << http://www.daemonnews.org/2009/11/24/first-look-microsoft-sharepoint-2010-beta.html >>, Retrieved Date: Feb. 3, 2010, pp. 4.
"TFS Builds for SharePoint Projects—Part 2", Retrieved at << http://dotnetslackers.com/Sharepoint/re-150131_TFS_Builds_for_SharePoint_Projects_Part_2.aspx >>, Nov. 2, 2008, pp. 4.
"Walkthrough: Creating a Custom Deployment Step for SharePoint Projects", Retrieved at << http://msdn.microsoft.com/en-us/library/ee256698%28VS.100%29.aspx >>, Retrieved Date: Feb. 3, 2010, pp. 16.
"Microsoft® Visual Studio 2010 Overview", Retrieved at << http://www.google.co.in/url?sa=t&source=web&ct=res&cd=8&ved=0CBoQFjAH&url=http%3A%2F%2Fdownload.microsoft.com%2Fdownload%2FC%2FD%2F3%2FCD39BB69-35CC-458A-B4EB-2F928B58FB4B%2FVisualStudio2010_Product Overview.pdf&ei=iwxpS-6AKpSyOgSI8qChCA&usg=AFQjCN HRVL2yY91qQGFxycCKytY3yScsxA >>, Retrieved Date: Feb. 3, 2010, pp. 11.
"Windows PowerShell", Retrieved at << http://en.wikipedia.org/wiki/Powershell >>, Retrieved Date: Mar. 31, 2010, pp. 14.

* cited by examiner

*Primary Examiner* — Anna Deng

(57) ABSTRACT

Aspects of the subject matter described herein relate to deployment scripts. In aspects, in conjunction with creating a package for deploying software to a target, an installation script is also created. The installation script includes instructions for deploying the software in the package to one or more targets. The installation script is human-readable and readily modifiable. A software development tool may provide a seamless interface that allows a software developer to view, edit, execute, and debug the installation script on a local or remote target.

15 Claims, 5 Drawing Sheets

DEPLOYMENT SCRIPT GENERATION AND EXECUTION

BACKGROUND

There are several approaches to deploying software. In one approach a software developer creates a solution that may include executable files, documents, and other data and distributes the solution with a document that describes how to install the solution. A person installing the solution may receive the solution in a package, extract the resources in the solution, and attempt to follow the steps prescribed in the document. If the installation document is complete and well-written and the installing person is skilled, this approach works, but may be time consuming.

Another approach to deploying software is to create an executable binary. The binary may then be executed to install the solution on a target device. In executing, the binary may detect the configuration of the target device, create folders, make registry and other database changes, extract files from the solution, install the files to the target device, and so forth. This approach is often opaque, fairly rigid, and may give an installing person few options for customizing the solution to the target device.

Other approaches also exist, but in general, deploying software on one or more machines may be complex, confusing, and time consuming.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to deployment scripts. In aspects, in conjunction with creating a package for deploying software to a target, an installation script is also created. The installation script includes instructions for deploying the software in the package to one or more targets. The installation script is human-readable and readily modifiable. A software development tool may provide a seamless interface that allows a software developer to view, edit, execute, and debug the installation script on a local or remote target.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
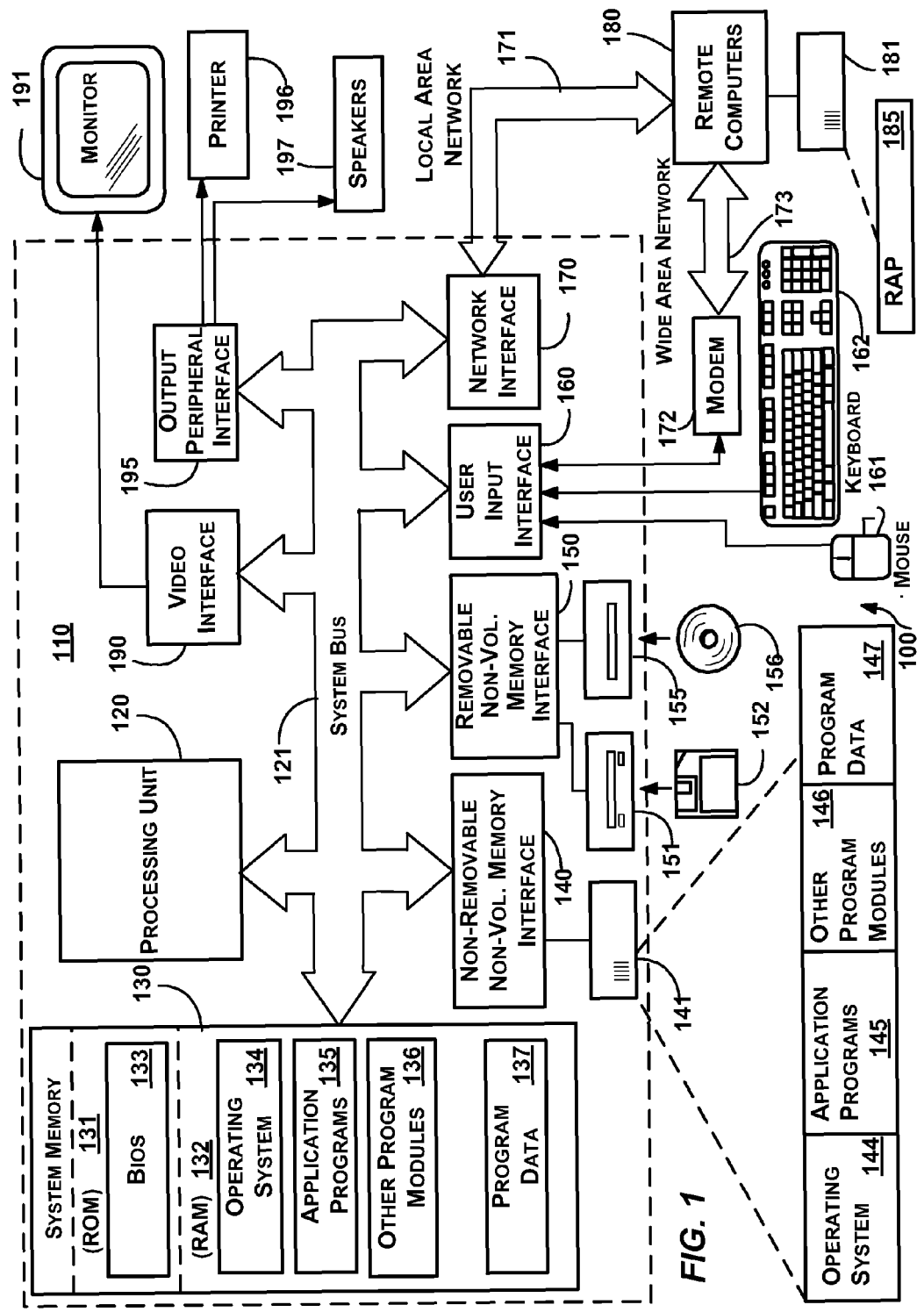
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Deployment

Figure 2:
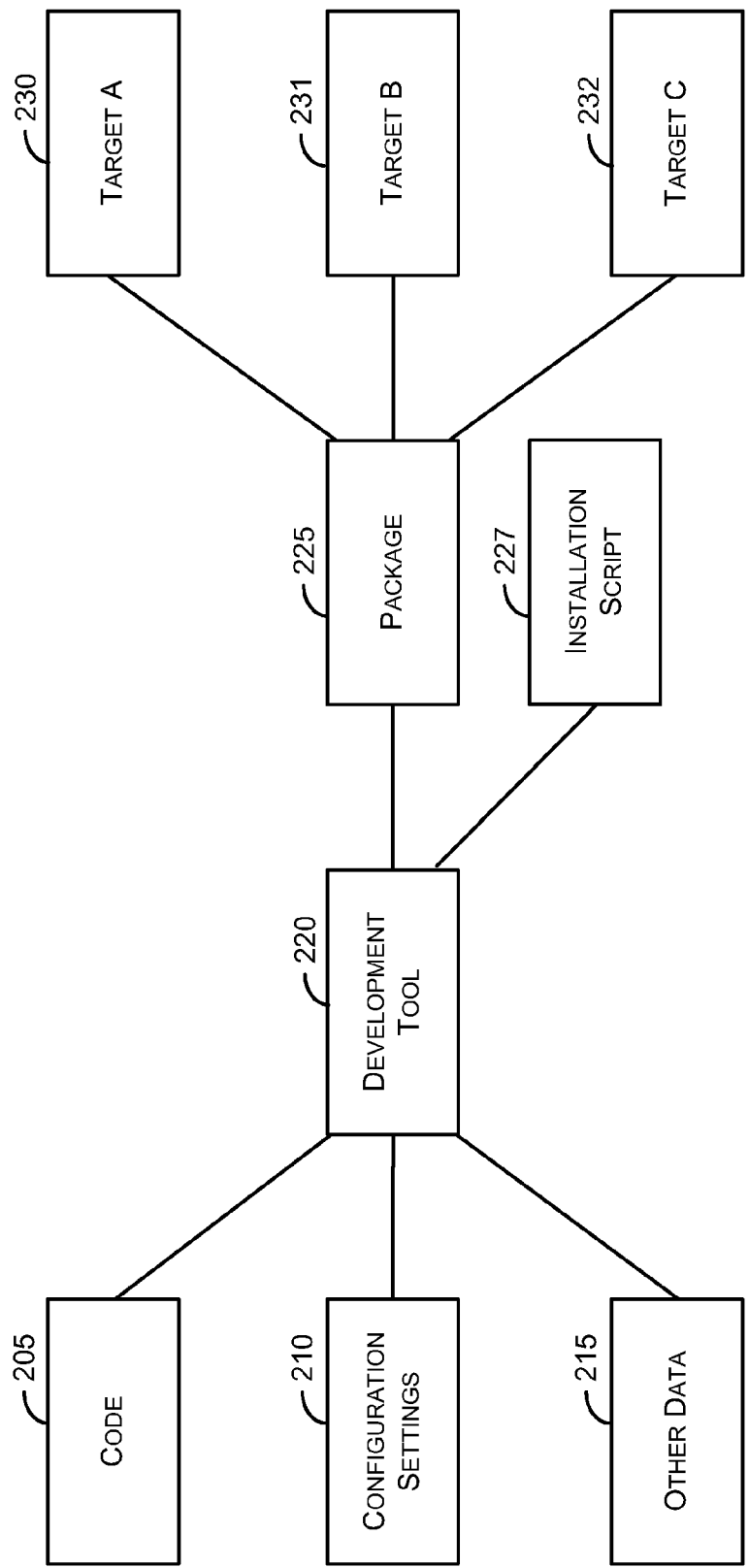
FIG. 2 is a block diagram representing an exemplary environment in which aspects of the subject matter described herein may be implemented.

As mentioned previously, deploying software on one or more machines may be complex and time consuming. FIG. 2 is a block diagram representing an exemplary environment in which aspects of the subject matter described herein may be implemented. The environment may include code 205, configuration settings 210, other data 215, a development tool 220, a package 225, targets 230-232, and may include other entities (not shown). The various entities may be located relatively close to each other or may be distributed across the world.

The various entities may be reachable via various networks including intra- and inter-office networks, one or more local area networks, wide area networks, direct connections, virtual connections, private networks, virtual private networks, some combination of the above, and the like.

The code 205 includes instructions that indicate actions a computer is to take. The code 205 may also include data, resources, variables, definitions, relationships, associations, and the like that include information other than actions the computer is to take. For example, the code may include images, Web pages, HTML, XML, other content, and the like. In an embodiment, the code may be included in a software project. A software project may include or reference the code, the other information indicated above, configuration information, and the like.

Actions indicated by the code 205 may be encoded in a source code language, intermediate language, assembly language, binary code, other language, some combination of the above, and the like.

The configuration settings 210 may include settings to make in a registry, database, or program specific data store. Settings may include data regarding configuration of one or more code units of a package. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The other data 215 may include data that is not configuration data. For example, the other data may include Web page data, user database data, test data, and the like.

The development tool 220 comprises a component used to develop and/or deploy software. As used herein, the term component is to be read to include all or a portion of a device, a collection of one or more software modules or portions thereof, some combination of one or more software modules or portions thereof and one or more devices or portions thereof, and the like. In one exemplary embodiment, the development tool may comprise an integrated development environment (IDE) that allows a software developer to enter and update code, debug code, create and update databases, associate the code with one or more databases, compile the code, create a package, do other actions, and the like.

The development tool 220 may invoke one or more processes to perform various actions. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

In operation, the development tool 220 may use the code 205, the configuration settings 210, and the other data 215 to create a package 225. In particular, the development tool 220 may place the code 205 or code derived therefrom together with configuration data (e.g., data from or code corresponding to the configuration settings 210) and the other data 215 or code derived therefrom into the package 225.

The package may include everything needed to install software on one or more targets. The package 225 may include code, configuration settings, and other data. One purpose of the package 225 is to combine the code, configuration settings, and other data in a deployment unit to simplify deployment. The package 225 may be a self-extracting file or files, a set of one or more files that are not self-extracting, an in-memory representation of the code, configuration settings, other data, and the like. The package 225 may include or be associated with a script (e.g., the installation script 227) for installing items in the package on a target.

In conjunction with creating the package 225, the development tool 220 may also create an installation script 227 for installing items in the package 225 on a target. The installation script 227 may include human-readable and modifiable text. Human-readable means that the text is written in a higher-level language that can be readily understood by humans. Higher-level languages have statements encoded with letters that are meant for human understanding. A higher-level language is a language that does not consist solely of 1's and 0's. Some examples of suitable higher-level languages include the scripting languages of WINDOWS POWERSHELL™, JavaScript, VBScript, XUL, XSLT, Perl, PHP, Python, Ruby, other scripting languages, and the like.

The examples of scripting languages indicated above are not intended to be all-inclusive or exhaustive. Indeed, based on the teachings herein, those skilled in the art may recognize many other scripting languages currently existing and yet to be developed to which the teachings herein may be applied without departing from the spirit or scope of aspects of the subject matter described herein.

When it executes, the installation script 227 may configure a target according to the configuration settings and other data included in the package 225. The installation script 227 may remove code previously installed for a previous solution (if any) and also install code included in the package 225 on the target. The installation script 227 may be placed inside the package 225 or may be placed in a file or other data structure.

Appendix A provides an exemplary installation script that is formatted according to the scripting language of WINDOWS POWERSHELL™. The script shown in Appendix A includes the following:

1. Variables and data structures that are based on project data and settings. For example, a variable may be included in one or more instructions for determining a location of the script in a file system. As another example, a variable may be included in one or more instructions for determining a location of the package associated with a script.

2. Functions that are common between scripts. For example, it may be desirable to include a set of functions for each script for a particular type of target (e.g., a target having SHAREPOINT® installed); and 3. Calls to various commands (e.g., cmdlets in an environment of WINDOWS POWERSHELL™ that implement specific functions) as well as functions defined in the script. For example, these commands may include instructions for enabling or disabling features of the software, instructions for installing the software on a target, and the like.

Some scripting languages support a pipe instruction. A pipe instruction passes the output generated by executing one command as the input to a component executed by another command. In some scripting languages, a tee may also be supported that allows splitting the output generated by executing one command to two or more destinations.

The particular example illustrated in Appendix A includes scripting code to install a solution for SHAREPOINT®. It is to be understood, however, that the teachings herein may be applied to other platforms without departing from the spirit or scope of aspects of the subject matter described herein.

Furthermore, although the script shown in Appendix A is formatted according to a scripting language of WINDOWS POWERSHELL™, it is not intended to limit aspects of the subject matter to only this language. Indeed, based on the teachings herein, those skilled in the art will recognize other scripting languages to which the teachings herein may be applied without departing from the spirit or scope of aspects of the subject matter described herein.

Once the installation script is generated, a software developer is free to modify and/or execute the script for a selected target. Because of the textual nature of the script, the software developer may readily understand, debug, and modify the script before deploying a package using the script.

In one embodiment, the development tool 220 may include options that allow a software developer to indicate whether after generation of a script the script is to be executed, opened in a visual editor, debugged, or the like. If the script is to be debugged or executed, the development tool 220 may launch a scripting environment suitable to execute the script, establish a communication channel with the environment, place breakpoints in the script, and pipe output from the execution of the script back to the development tool. Such output may be used to step through the actions of a script via the development tool 220. The scripting environment may be of the same type (e.g., a 32-bit) or a different type (e.g., a 64-bit) from the environment that hosts the development tool 220.

The development tool 220 may provide a user interface that allows a software developer to indicate order of deployment steps and whether certain features of the deployed software are enabled or disabled. For example the development tool 220 may allow a software developer to indicate whether a prior solution need to be retracted, what features of a solution need to be activated or deactivated, as well as actions that may need to take place with respect to particular target platform. For example, with SharePoint, workflows may need to be disassociated with a prior solution and associated with a solution that is being installed on a machine.

The targets 230-232 may comprise virtual or physical targets. The term virtual target includes an environment or a portion thereof that is simulated or emulated by a computer. For example, when a machine is simulated or emulated at the hardware level, the resulting entity is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth. Although a virtual machine is one suitable virtual target, other exemplary virtual targets include virtual environments in which operating systems or portions thereof may be emulated or simulated.

A physical target may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

In one embodiment, a target may reside on the same machine as the development tool 220. This type of target may be used, for example, to develop and debug a solution to be deployed to other machines.

Although the environment described above includes various numbers of the entities, it will be recognized that more, fewer, or a different combination of these entities and others may be employed without departing from the spirit or scope of aspects of the subject matter described herein.

Figure 3:
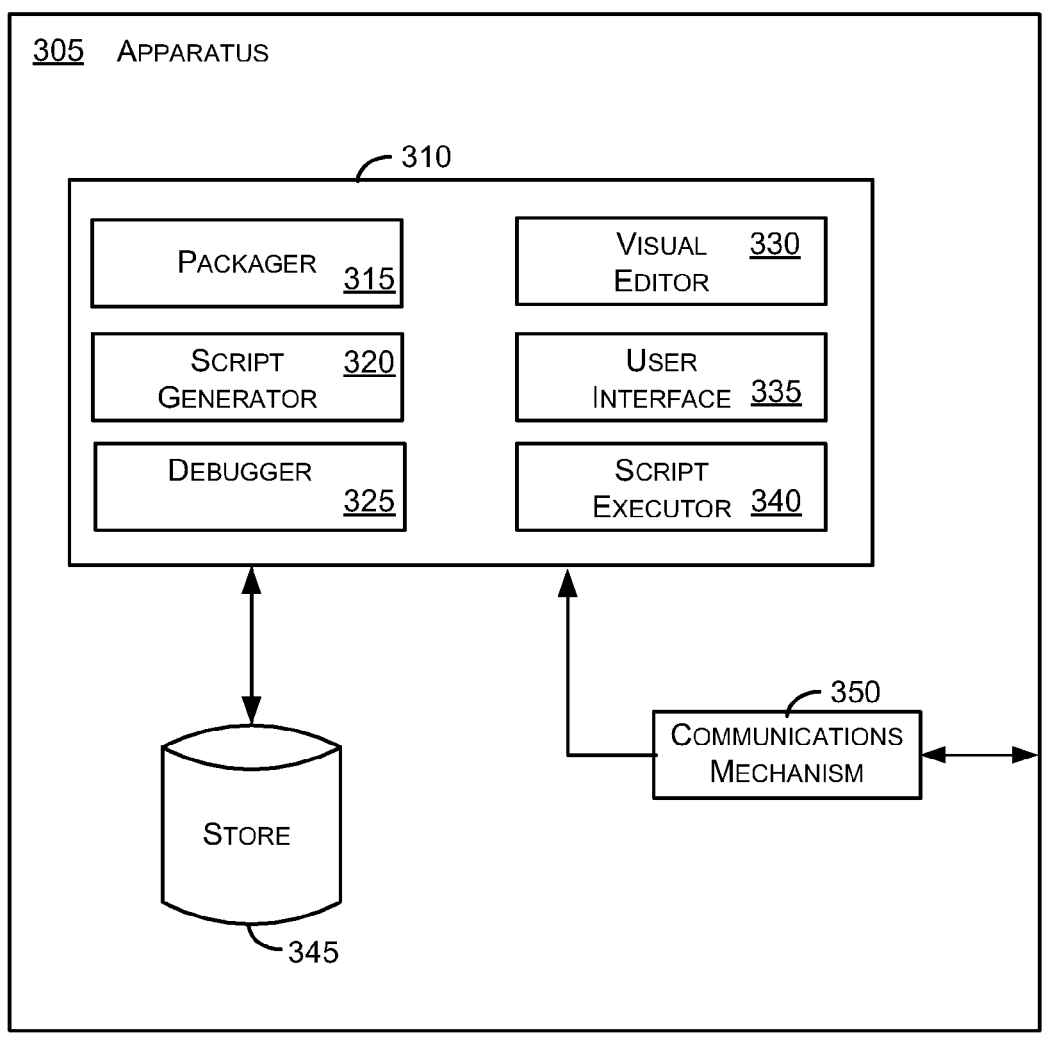
FIG. 3 is a block diagram that represents an apparatus configured in accordance with aspects of the subject matter described herein.

FIG. 3 is a block diagram that represents an apparatus configured in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the apparatus 305 may include software development components 310, a store 345, a communications mechanism 350, and other components (not shown). The apparatus 305 may host the development tool 220 and may have access to the code 205, configuration settings 210, and other data 215 of FIG. 2. The apparatus 305 may be implemented on or as a computer (e.g., as the computer 110 of FIG. 1).

The software development components 310 may be included as part of the development tool 220 or may be separate from the development tool 220 of FIG. 2. The software development components 310 may include a packager 315, a script generator 320, a debugger 325, a visual editor 330, a user interface 335, a script executor 340, and other components (not shown).

The communications mechanism 350 allows the apparatus 305 to communicate with other entities. For example, the communications mechanism 350 may allow the apparatus to communicate with the targets 230-232. The communications mechanism 350 may be a network interface or adapter 170, modem 172, or any other mechanism for establishing communications as described in conjunction with FIG. 1.

The store 345 is any storage media capable of storing data involved with software development. The store 345 may comprise a file system, database, volatile memory such as RAM, other storage, some combination of the above, and the like and may be distributed across multiple devices. The store 345 may be external, internal, or include components that are both internal and external to the apparatus 305.

The packager 315 may be operable to obtain code, configuration settings, and other data, if any, and to place data corresponding to these items in a package for deploying to one or more targets. Some or all of the configuration settings and/or other data may or may not be placed in the package. For example, configuration settings that affect the target environment or software components installed therein may be encoded in an installation script that configures the target environment and/or software components. Configuration settings that affect what software is placed in the package may be carried out by placing the designated software in the package while omitting non-designated software.

Likewise, other data, if any, may be placed directly in the generated package or may be encoded in an installation script. For example, images, resources, databases, and other data may be placed in the generated package while modifications of existing data on a target may be encoded in an installation script.

The script generator 320 is operable to obtain metadata of a software project and to generate a script therefrom. The metadata may include project settings, target information, and other data regarding a project. For example, the metadata may indicate what is to be done after generating a script. For example, the metadata may indicate that the script is to be automatically executed to install the project in a local environment, that the script is to be opened for editing but not to be automatically executed, that the script is to be debugged, or the like.

As another example, the metadata may include data that indicates an order for installing items of the software project. For example, in some environments some software components may need to have other software components installed before they are installed.

As another example, the metadata may include data regarding features that are to be enabled or disabled in conjunction with installing the software. For example, a software developer may indicate that basic features are to be enabled but that advanced features are to be disabled when installing software on a target.

The script generator 320 may use the metadata to determine and place corresponding instructions in a generated installation script.

The debugger 325 may be operable to establish a communication channel with an execution environment (e.g., an environment of WINDOWS POWERSHELL™, Unix shell, or some other environment), to insert a breakpoint into the script, to receive output generated by executing the script via the communication channel, and to display the output via the user interface 335.

The debugger 325 may be further operable to display variables values created by executing the script that existed just prior to stopping the script at the breakpoint. For example, the debugger 325 may insert extra statements into the script to cause the script to output the variable values just prior to the breakpoint. These extra statements may be visible or removed when viewing the script in the visual editor 330. As used herein, variable values may include any data that may be included in a variable including string data, date data, numerical data, a combination of the above, and the like.

The visual editor 330 may be operable to display the script via the user interface 335 and to receive editing instructions regarding the script via the user interface 335. The visual editor 330 may also allow a software developer to set and clear breakpoints, enter compilation and execution commands, and otherwise interact with a project corresponding to the script.

The user interface 335 provides a mechanism by which a software developer may interact with a software project. The user interface 335 may interface with a display, printer, or other output device as well as a keyboard, mouse, touch pad, microphone, or other input device. The user interface 335 may relay input from a software developer to other components and provide output from the other components to the software developer.

The script executor 340 may be operable to launch an execution environment for executing the script and to execute the script therein in response to input received from a user interface 335. This execution environment may be launched on the apparatus 305 or on a remote apparatus. The script executor 340 may set up a communication channel by which it may set up the execution environment, execute the script in the execution environment, and by which it may receive output from the executing script.

Figure 4:
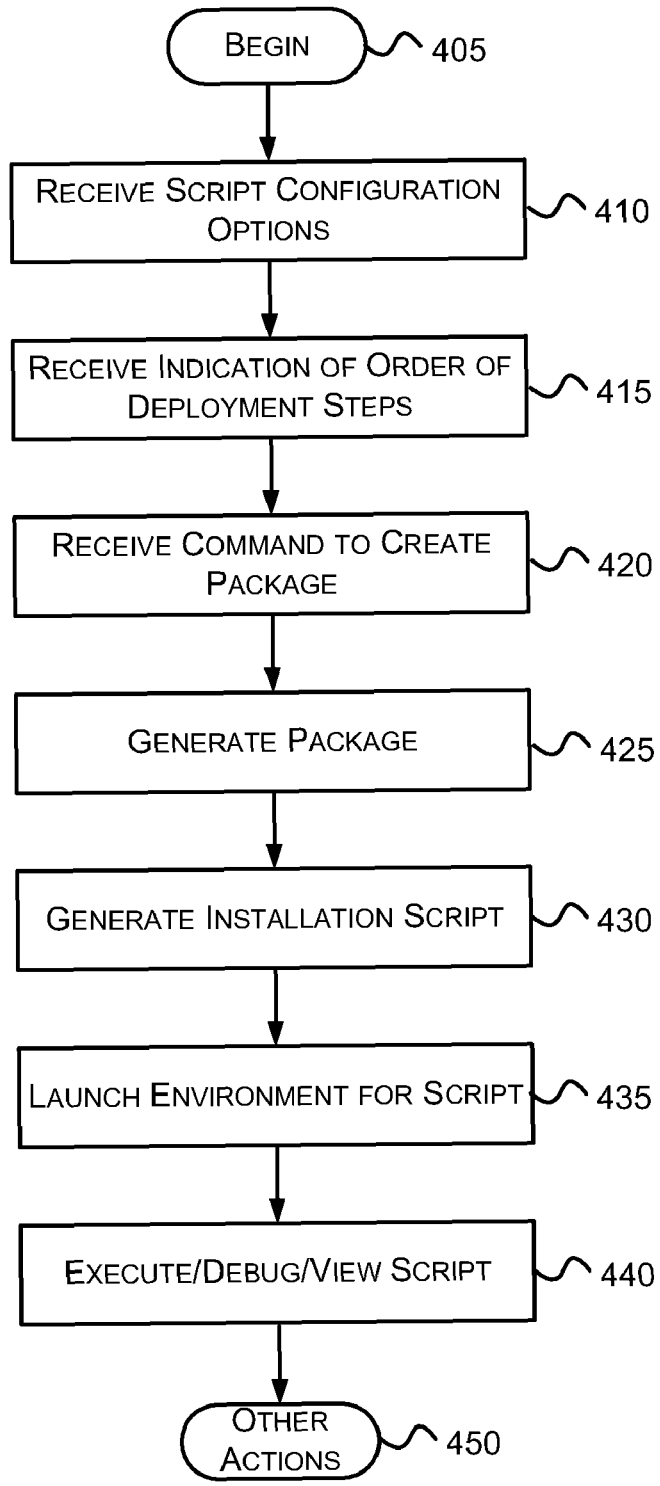
FIG. 4 is a flow diagram that generally represents actions that may occur in a development environment in accordance with aspects of the subject matter described herein.
Figure 5:
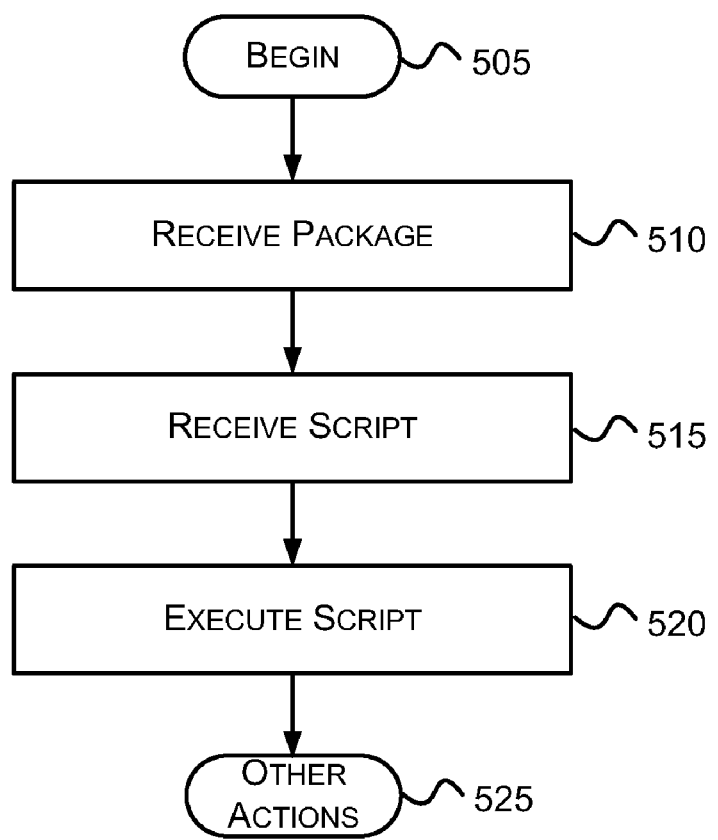
FIG. 5 is a flow diagram that generally represents actions that may occur in conjunction with installing a package on a target in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents actions that may occur in a development environment in accordance with aspects of the subject matter described herein. At block 405, the actions begin. For example, referring to FIG. 2, a user may load a project using the development tool 220.

At block 410, script configuration options may be received. For example, referring to FIG. 3, the user interface 335 may receive indications as to what the user desires to happen to the script after it is generated. For example, a user may indicate that the script is to be executed, debugged, viewed, that the user is simply to be notified after the script has been created, or the like.

At block 415, an indication of order of deployment steps may be received via a user interface. In addition, an indication of which deployment steps are to be performed may also be received via the user interface. For example, referring to FIG. 3, the user interface 335 may receive input from a user regarding which deployment steps and/or an order of deployment steps. In response, data indicative of the deployment steps and/or order may be stored in project metadata. Later, in generating a script, this data may be retrieved and instructions in the script (where relevant) may be placed in the order based on the data.

At block 420, a command to create a package is received. For example, referring to FIG. 3, a command to create a package that includes deployable software may be received via the user interface 335.

At block 425, the package may be created. For example, referring to FIG. 3, the packager 315 may obtain code, configuration settings, and other data corresponding to a software project from the store 345, memory, or elsewhere and may place data corresponding thereto in a package for deploying to one or more targets.

At block 430, an installation script may be generated. For example, referring to FIG. 3, the script generator 320 may create a text-based, modifiable installation script that includes computer-executable instructions for deploying the software of a project to one or more targets. Generating this installation script may include one or more of:

1. Placing one or more instructions in the script for determining a location of the script on a file system;
2. Placing one or more instructions in the script for determining a location of the package;
3. Placing one or more instructions in the script for enabling one or more features of the software; and
4. Placing one or more instructions in the script for installing the software on a target.

A text-based installation script is one that is encoded in a higher level language as described previously instead of solely of 1's and 0's. One example of a text-based, modifiable installation script is shown in Appendix A.

At block 435, an environment may be launched for executing the script. For example, referring to FIG. 3, the script executor 340 may instantiate an environment (e.g., an environment of WINDOWS POWERSHELL™ or other environment) for executing a script. If the environment is already available, the script executor 340 may skip this step and connect with the existing environment.

At block 440, an action may be taken with respect to the script. In particular, the script may be executed, debugged, viewed, edited, or the like. For example, referring to FIG. 3, the visual editor 330 may display a script and allow a user to edit the script. In conjunction with debugging or running a script, one or more of the software components 310 may establish a communication channel with the environment, execute the script in the environment, receive output generated by executing the script via the communication channel, and display the output via the user interface 335.

At block 450, other actions, if any, may be performed.

FIG. 5 is a flow diagram that generally represents actions that may occur in conjunction with installing a package on a target in accordance with aspects of the subject matter described herein. At block 505, the actions begin.

At block 510 a package that includes software is received. For example, referring to FIG. 2, the package 225 is received.

At block 515, an installation script associated with the package is received. For example, referring to FIG. 2, the installation script 227 may be received. The installation script may be part of the package or be separate from the package. The order of the actions corresponding to blocks 510 and 515 may be reversed. For example, the script may be loaded first and may even begin executing until the package is needed, at which time the package may be requested and received.

At block 520, the script is executed to deploy the software to a target. For example, referring to FIG. 2, the installation script 227 may be executed in a scripting environment to install the package 225 on the target 230.

At block 525, other actions, if any, may be performed. For example, changes to the script may be received from an editor. These changes may be incorporated into the script before or after executing the script.

As can be seen from the foregoing detailed description, aspects have been described related to deployment scripts. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

---

APPENDIX A

```
$url = "http://" + [System.Environment]::MachineName
$solutionId = New-Object System.Guid "f43f148a-84bf-41ed-b9ec-92c96bf83a02"
$scriptPath = $MyInvocation.MyCommand.Path
$scriptFolder = [System.IO.Path]::GetDirectoryName($scriptPath)
$scriptPath = [System.IO.Path]::GetFileNameWithoutExtension($scriptPath)
$scriptPath = [System.IO.Path]::ChangeExtension($scriptPath, ".wsp")
$scriptPath = [System.IO.Path]::Combine($scriptFolder, $scriptPath)
$solutionPackagePath = $scriptPath
$features = @(
    @{"Id"= New-Object System.Guid "0869554b-72da-4f8a-9c57-452bb3ee05cf";
"Scope"= "Site"; "Url"= "$url"}
)
$workflowTemplates = @(
    @{"Id"= New-Object System.Guid "50be39c7-7014-4dcd-99fe-ab8cb690e36e";
"DisplayName"= "WorkflowProject5 - Workflow1"; "WorkflowType"= "List";
"TaskListId"= New-Object System.Guid "b51aac13-02d4-485c-a68f-3f9dd9decf77";
"TaskListName"= "Tasks"; "HistoryListId"= New-Object System.Guid "01687985-b2ef-
4f49-a26d-932e3b95ebd8"; "HistoryListName"= "Workflow History"; "TargetListId"= New-
Object System.Guid "005cf816-eff7-480f-84ca-77141e9059a1"; "TargetListName"=
"Calendar"; "StartOnCreate"= $False; "StartOnChange"= $False; "StartManual"= $True}
)
Function EnsurePSSnapIn
{
    [string]$snapinName = "Microsoft.SharePoint.PowerShell"
    if (!(Get-PSSnapIn | Where-Object { $_.Name -eq $snapinName }))
    {
        Add-PSSnapin $snapinName
    }
    Write-OutPut "$snapinName snapin is loaded."
    return $true
}

# Recycle IIS Application Pool
```

APPENDIX A

```
    #
    Function
RecycleIISAppPool([Microsoft.SharePoint.Administration.SPWebApplication]$webApp)
    {
        Write-OutPut "Recycling the IIS Application Pool..."
        $appPoolName = $webApp.ApplicationPool.Name
        $appPool = Get-WmiObject -namespace "root\MicrosoftIISv2" -class
"IIsApplicationPool" | Where-Object { $_.Name -eq "W3SVC/APPPOOLS/$appPoolName"
}
        $appPool.Recycle( )
        $result = $?
        if ($result)
        {
            Write-OutPut "Successfully recycled the IIS Application Pool."
        }
        else
        {
            Write-OutPut "Unable to recycle the IIS Application Pool."
        }
        return $result
    }
    #
    # Retract Solution
    #
    Function RetractFarmSolution([System.Guid]$solutionId,
[Microsoft.SharePoint.SPWeb]$site, [Microsoft.SharePoint.SPSite]$siteColl)
    {
        Write-OutPut "Retracting the farm solution..."
        $solution = Get-SpSolution | Where-Object { $_.SolutionId -eq $solutionId }
        if ($solution)
        {
            # Deactivate features
            $site.Features | Where-Object { $_.Definition.SolutionId -eq $solutionId } |
ForEach-Object { Disable-SpFeature -identity $_ -url $url -Confirm:$false }
            $siteColl.Features | Where-Object { $_.Definition.SolutionId -eq $solutionId } |
ForEach-Object { Disable-SpFeature -identity $_ -url $url -Confirm:$false }
            Uninstall-SpSolution $solutionId -Local -Confirm:$false
            Remove-SpSolution $solutionId -Confirm:$false
            $result = $?
            if ($result)
            {
                Write-OutPut "Successfully retracted the farm solution."
            }
            else
            {
                Write-OutPut "Unable to retract the farm solution."
            }
            return $result
        }
        Write-OutPut "The farm solution was not found."
        return $true
    }
    Function RetractUserSolution([System.Guid]$solutionId,
[Microsoft.SharePoint.SPWeb]$site, [Microsoft.SharePoint.SPSite]$siteColl)
    {
        Write-OutPut "Retracting the user solution..."
        $solution = Get-SpUserSolution -Site $siteColl | Where-Object { $_.SolutionId -eq
$solutionId }
        if ($solution)
        {
            # Deactivate features
            $site.Features | Where-Object { $_.Definition.SolutionId -eq $solutionId } |
ForEach-Object { Disable-SpFeature -identity $_ -url $url -Confirm:$false }
            $siteColl.Features | Where-Object { $_.Definition.SolutionId -eq $solutionId } |
ForEach-Object { Disable-SpFeature -identity $_ -url $url -Confirm:$false }
            Uninstall-SpUserSolution $solution -Site $siteColl -Confirm:$false
            Remove-SpUserSolution $solution.Name -Site $siteColl -Confirm:$false
            $result = $?
            if ($result)
            {
                Write-OutPut "Successfully retracted the user solution."
            }
            else
            {
                Write-OutPut "Unable to retract the user solution."
            }
            return $result
        }
```

APPENDIX A -continued

```
            Write-OutPut "The user solution was not found."
            return $true
    }
    #
    # Add Solution
    #
    Function AddFarmSolution([string]$solutionPath)
    {
            Write-OutPut "Installing the farm solution..."
            $solution = Add-SpSolution $solutionPath
            Install-SpSolution $solution -Local -GACDeployment
            $result = $?
            if ($result)
            {
                    Write-OutPut "Successfully installed the farm solution."
            }
            else
            {
                    Write-OutPut "Unable to install the farm solution."
            }
            return $result
    }
    Function AddUserSolution([string]$solutionPath, [System.Guid]$solutionId,
[Microsoft.SharePoint.SPSite]$siteColl)
    {
            Write-OutPut "Installing the user solution..."
            Add-SpUserSolution $solutionPath -Site $siteColl
            $solution = Get-SpUserSolution -Site $siteColl | Where-Object { $_.SolutionId -eq
$solutionId }
            $installedSolution = Install-SpUserSolution $solution -Site $siteColl
            $result = $?
            if ($result)
            {
                    Write-OutPut "Successfully installed the user solution."
            }
            else
            {
                    Write-OutPut "Unable to install the user solution."
            }
            return $result
    }
    #
    # Activate Feature
    #
    Function ActivateFeature($featureHash)
    {
            [System.Guid]$featureId = $featureHash["Id"]
            [System.Uri]$url = $featureHash["Url"]
            Write-OutPut ("Activating feature '" + $featureId + "'...")
            Enable-SpFeature $featureId -url $url
            $result = $?
            if ($result)
            {
                    Write-OutPut "Successfully activated the feature."
            }
            else
            {
                    Write-OutPut "Unable to activate the feature."
            }
            return $result
    }
    #
    # Disassociate List Workflow Template
    # The workflow is assumed to be a "Site"-associated list workflow.
    #
    Function DisassociateListWorkflowTemplate([Microsoft.SharePoint.SPWeb]$site,
$templateHash)
    {
            [System.Guid]$templateId = $templateHash["Id"]
            [string]$templateDisplayName = $templateHash["DisplayName"]
            [System.Guid]$targetListId = $templateHash["TargetListId"]
            [string]$targetListName = $templateHash["TargetListName"]
            Write-OutPut ("Dissasociating workflow template '" + $templateDisplayName + "'
from target list '" + $targetListName + "'...")
            $targetList = $site.Lists[$targetListId]
            if(!$targetList) { $targetList = $site.Lists[$targetListName] }
            if($targetList)
            {
```

-continued

APPENDIX A

```
            $currentCulture = [System.Globalization.CultureInfo]::CurrentCulture
            $association =
$targetList.WorkflowAssociations.GetAssociationByName($templateDisplayName,
$currentCulture)
            if ($association) {
                $targetList.WorkflowAssociations.Remove($association)
                $result = $?
                if ($result)
                {
                    Write-Output "Successfully removed the workflow association."
                    return $result
                }
            }
            Write-Output "The workflow association does not exist."
            return $true
        }
        Write-Output "The target list does not exist."
        return $true
    }
    #
    # Associate Workflow Template
    # The workflow is assumed to be a "Site"-associated list workflow.
    #
    Function AssociateListWorkflowTemplate([Microsoft.SharePoint.SPWeb]$site,
$templateHash)
    {
        [System.Guid]$templateId = $templateHash["Id"]
        [string]$templateDisplayName = $templateHash["DisplayName"]
        [System.Guid]$targetListId = $templateHash["TargetListId"]
        [string]$targetListName = $templateHash["TargetListName"]
        [System.Guid]$taskListId = $templateHash["TaskListId"]
        [string]$taskListName = $templateHash["TaskListName"]
        [System.Guid]$historyListId = $templateHash["HistoryListId"]
        [string]$historyListName = $templateHash["HistoryListName"]
        [bool]$startOnCreate = $templateHash["StartOnCreate"]
        [bool]$startOnChange = $templateHash["StartOnChange"]
        [bool]$startManual = $templateHash["StartManual"]
        Write-OutPut ("Creating association between workflow template '" +
$templateDisplayName + "' and target list '" + $targetListName + "'...")
        $template = $site.WorkflowTemplates.GetTemplateByBaseID($templateId)
        if ($template) {
            $targetList = $site.Lists[$targetListId]
            if(!$targetList) { $targetList = $site.Lists[$targetListName] }
            if ($targetList) { "Found Target List" } else { "Target List Not Found" }
            $taskList = $site.Lists[$taskListId]
            if(!$taskList) { $taskList = $site.Lists[$taskListName] }
            if ($taskList) { "Found Task List" } else { "Task List Not Found" }
            $historyList = $site.Lists[$historyListId]
            if(!$historyList) { $historyList = $site.Lists[$historyListName] }
            if ($historyList) { "Found History List" } else { "History List Not Found" }
            $association =
[Microsoft.SharePoint.Workflow.SPWorkflowAssociation]::CreateListAssociation($template
, $templateDisplayName, $taskList, $historyList)
            if ($association) {
                $association.AutoStartCreate = $startOnCreate
                $association.AutoStartChange = $startOnChange
                $association.AllowManual = $startManual
                $dummy = $targetList.WorkflowAssociations.Add($association)
                $result = $?
                if ($result) {
                    $targetList.Update( )
                    Write-Output "Successfully added the workflow association."
                    return $result
                }
            }
            Write-Output "Failed to create the workflow association."
            return $false
        }
        Write-Output "The workflow template does not exist."
        return $false
    }
    EnsurePSSnapIn
    $webApp = Get-SPWebApplication $url
    $site = Get-SPWeb $url
    $siteColl = Get-SPSite $url
    RecycleIISAppPool $webApp
    $workflowTemplates | ForEach-Object { DisassociateListWorkflowTemplate $site $_ }
    RetractFarmSolution $solutionId $site $siteColl
```

-continued

APPENDIX A

```
RetractUserSolution $solutionId $site $siteColl
AddFarmSolution $solutionPackagePath
$site.Dispose( )
$site = Get-SPWeb $url
$features | ForEach-Object { ActivateFeature $_}
$workflowTemplates | ForEach-Object { AssociateListWorkflowTemplate $site $_}
```

What is claimed is:

1. A method implemented at least in part by a computer, the method comprising:
    receiving a command to create a package that includes deployable software via a user interface of a software development tool;
    receiving an indication of an order of deployment steps via the user interface, storing data indicative of the steps in a project associated with the software, retrieving the data, and placing at least some instructions in a text-based, modifiable script in the order based on the data;
    in response to the command, generating the script that includes computer-executable instructions for deploying the software, by performing actions, comprising:
        placing a pipe instruction in the script, the pipe instruction instructing an environment that executes the script to pass output generated from one component called via the script to another component called via the script;
        placing one or more instructions in the script for determining a location of the script on a file system;
        placing one or more instructions in the script for determining a location of the package;
        placing one or more instructions in the script for enabling one or more features of the software;
        placing one or more instructions in the script for installing the software on a target; and
        generating the script formatted according to a scripting language of an environment shell.

2. The method of claim 1, further comprising executing the script to install the deployable software on a machine hosting the software development tool.

3. The method of claim 1, further comprising receiving from the user interface an instruction to view the script after the script has been generated and, in response, automatically displaying the script on a display after the script has been generated.

4. The method of claim 1, further comprising launching an environment in which to execute the script, establishing a communication channel with the environment, executing the script in the environment, receiving output generated by executing the script via the communication channel, and displaying the output via the user interface.

5. The method of claim 1, further comprising debugging the script via the software development tool.

6. The method of claim 5, wherein debugging the script via the software development tool comprises placing a breakpoint in the script, executing the script to the breakpoint, receiving output of the script via the software development tool, displaying the output of the script via the user interface, and displaying via the software development tool an indication of an instruction of the script to be executed next.

7. In a computing environment, an apparatus, comprising:
    a processing unit coupled to a memory, the memory comprising:
        a user interface component operable to receive a command to create a package that includes deployable software via a user interface of a software development tool, the user interface component further operable to receive an indication of an order of deployment steps via the user interface and store data indicative of the steps in a project associated with the software;
        a packager operable to retrieve the data, obtain code, configuration settings, and other data, if any, corresponding to the software project and to place at least some data corresponding thereto in a package for deploying to one or more targets;
        a script generator operable to receive metadata of the project and to create a script therefrom, the script generator further operable to place at least some instructions in the script in the order based on the data, the script including:
            one or more pipe instruction instructing an environment that executes the script to pass output generated from one component called via the script to another component called via the script;
            one or more instructions for determining a location of the script on a file system;
            one or more instructions for determining a location of the package;
            one or more instructions for enabling one or more features of software of the project on a target; and
            one or more instructions for installing the software on the target, wherein the script is formatted according to a scripting language of an environment shell.

8. The apparatus of claim 7, further comprising the script generator further operable to automatically cause the script to be displayed via the user interface after the script is generated.

9. The apparatus of claim 7, further comprising a script executor operable to launch an execution environment on the apparatus for executing the script and to execute the script therein in response to input received from a user interface.

10. The apparatus of claim 9, further comprising a debugger operable to establish a communication channel with the execution environment, to insert a breakpoint into the script, to receive output generated by executing the script via the communication channel, and to display the output via the user interface.

11. The apparatus of claim 10, wherein the debugger is further operable to display variables values created by executing the script that existed just prior to stopping the script at the breakpoint.

12. The apparatus of claim 7, further comprising an editor operable to display the script via the user interface and to receive editing instructions regarding the script via the user interface.

13. The apparatus of claim 7, wherein the metadata indicates an order for at least two of the one or more instructions for installing the software on the target.

14. The apparatus of claim 7, wherein the metadata indicates the one or more features to enable.

15. A computer storage medium having computer-executable instructions, which when executed perform actions, comprising:
- receiving a package that includes software;
- receiving a text-based modifiable script that includes computer-executable instructions for deploying the software, the instructions including:
  - one or more pipe instructions instructing an environment that executes the script to pass output generated from one component called via the script to another component called via the script;
  - one or more instructions for determining a location of the script on a file system;
  - one or more instructions for determining a location of the package; and
  - one or more instructions for installing the software;
- receiving changes to the script from an editor that displays the script and receives input related thereto and incorporating the changes in the script, the editor further operable to receive an indication of an order of deployment steps via the editor, store data indicative of the steps in a project associated with the software, retrieve the data, and placing at least some instructions in the script in the order based on the data; and
- executing the script in a scripting environment to deploy the software to a target.

* * * * *